April 1, 1941.  W. H. HUNGERFORD  2,237,102
BAKING TRAY AND METHOD OF MAKING IT
Filed July 9, 1938
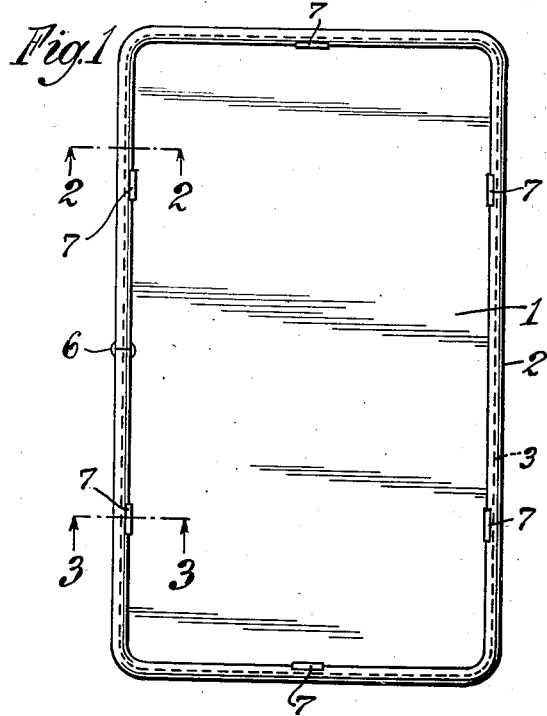
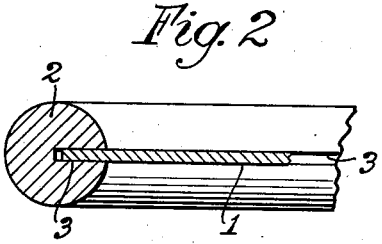
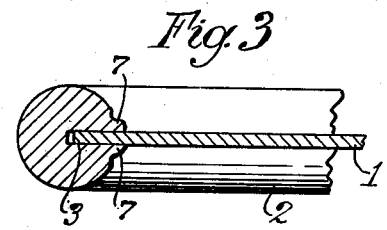
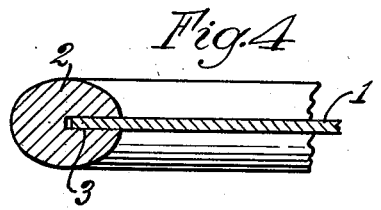
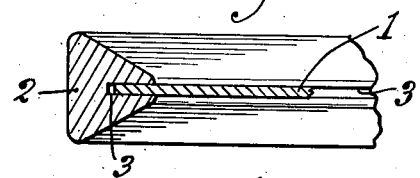
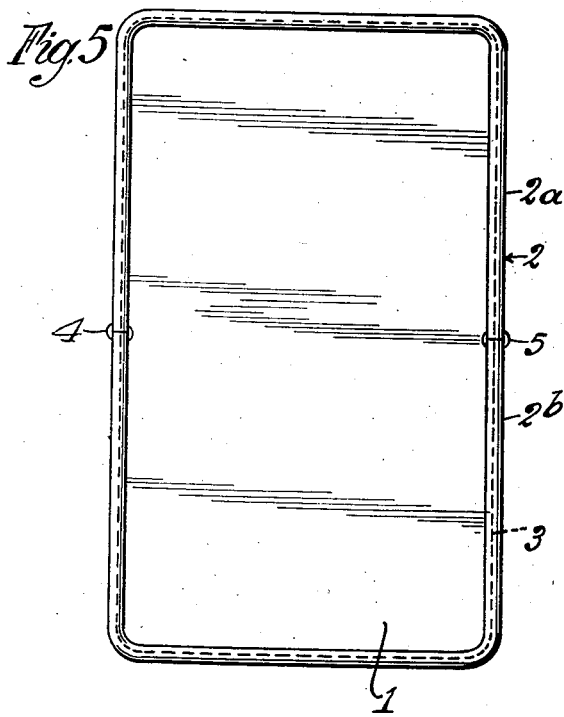
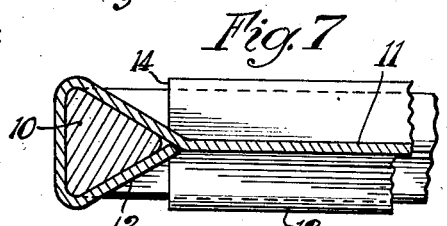
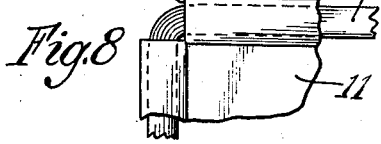
Inventor
Warren H. Hungerford
by Parker & Carter
Attorneys.

Patented Apr. 1, 1941

2,237,102

UNITED STATES PATENT OFFICE 2,237,102

BAKING TRAY AND METHOD OF MAKING IT

Warren H. Hungerford, Chicago, Ill.

Application July 9, 1938, Serial No. 218,389

4 Claims. (Cl. 53—6)

My invention relates to an improved tray for baking articles, such for example as cookies and the like, and to an improved method of making it.

One purpose is the provision of a tray which shall be cheap to construct and durable and efficient in use.

Another purpose is the provision of a tray which shall be reversible and which can be employed for different types and conditions of baking on opposite sides thereof.

Another purpose is the provision of a tray adaptable to automatic or machine handling and from which the articles baked can readily be removed.

Another purpose is the provision of a tray of sheet metal or the like having a surrounding rim which performs a reinforcing and supporting function and also serves to protect the edge of the sheet metal body of the tray from rust or deterioration.

Another purpose is the provision of a tray which can readily be repaired or straightened.

Other purposes will appear from time to time in the course of the specification and claims.

This application is a continuation in part of my application filed December 3, 1937, Serial No. 177,942.

I illustrate my invention more or less diagrammatically in the accompanying drawing wherein:

Figure 1 is a plan view;

Figure 2 is a section on the line 2—2 of Figure 1;

Figure 3 is a section on the line 3—3 of Figure 1;

Figure 4 is a similar section through a variant form of rod or circumferential reinforcement;

Figure 5 is a plan view of a variant form;

Figure 6 is a section similar to Figure 2 showing a different type of rod;

Figure 7 is a section through a variant form; and

Figure 8 is a partial plan view of the structure shown in Figure 7.

Like parts are indicated by like symbols throughout the specification and drawing.

Referring to the drawing, I indicates a sheet of sheet metal or the like which forms the body for the tray. While it may be illustrated in a wide variety of shapes and sizes, I may for example employ a tray 24 inches by 40 inches in size. Surrounding the tray and maintaining it flat and sufficiently stiff to handle, I employ a rim 2 herein shown as in the form of a rod longitudinally slotted as at 3. The rod may be rounded if desired or it may be oval as shown in Figure 4, and under some circumstances and with some sizes of articles the oval shape may have an advantage in permitting ready removal of the biscuits or the articles cooked from the tray. A beveled off or inclined surface is a particular advantage when the pan is used in automatic dumping machines. Under such circumstances, the goods will slide off more readily when the pan is used with the more or less flattened type of rod shown in Figure 4 or with the triangular or inclined rod members shown in Figures 6 and 7.

In the form of Figure 5 I illustrate the rod 2 as formed of two parts, 2a and 2b, which may be welded to each other at opposite sides of the tray as at 4 and 5. Preferably at the welding points the ends of the rod sections are not merely secured to each other but to the tray body I itself. It is preferable to have the welds on the long sides of the tray as those are the sides which would be most likely to buckle or bend away from the edge of the sheet I.

I may also find it desirable to crimp or otherwise to subject the rod 2 to pressure in order to clamp the opposite sides of the slot 3 together against the opposed faces of the sheet I. I may for example employ any suitable dies which need not be illustrated herein as they do not form part of the present invention per se but which crimp or bend the rod 2 as at 7, 7. It will be understood that any suitable means may be employed for securing the rod in relation to the edge of the sheet but crimping or welding, separately or together, will serve as satisfactory and practical examples.

In the actual manufacture of the device, I preferably employ rod stock and slot it or cause it to be slotted longitudinally, the slot being rectilinear when the rod is rectilinear. I cut the members I to the proper and predetermined size in any suitable manner and then form the rod 2, or the separate sections 2a and 2b, by bending them at the corners in such fashion as to cause them to conform to the size and shape of the member I.

Whereas in Figure 1 I employ a single rod section 2, I spread it apart slightly to permit the member I to be positioned in the slot 3 and then move the member 2 back into shape, preferably in response to its own tendency to take the shape in which it is set. I then weld the rod ends together as at 6 and this weld has for one function to secure the rod ends also firmly in relation to the plate I, the weld including the opposed surfaces of the rod ends and the plate. In order to prevent any tendency from the unwelded sides of the rod to spring free, I then thereafter put the article in any suitable die and crimp the rod 2 as at 7, 7. This crimping must be done on the side of the rod adjacent the slot so that the lips of the slot 3 are forced together against the opposite sides of the plate 1.

Where I employ the form of Figure 5, with the separate members 2a and 2b, I may use the two welds 4 and 5 and may if I wish entirely dispense with any crimping. It will be understood also that if desired I can substitute welding for crimping or crimping for welding, and may spot weld or otherwise weld the rod 2 to the plate 1 intermediate its ends, or may crimp the rod ends together.

Figure 6 illustrates specifically the employment of a rod which is triangular in cross section with the inclined faces overlying the edge of the body portion 1. In Figure 7, a triangular rod 10 is employed but without the slot 3. In this form of my device, the body portion 11 of the tray of sheet metal or the like may be folded around the outside of the rod 10 as at 12. This folding may be made for convenience by notching out the corners of the pan body as at 14.

Whereas in Figures 7 and 8 I have illustrated the rod 10 as triangular in cross section, it will be understood that the same construction of the pan may be employed with rods of other forms, such as round, oval or the like.

It will be realized that whereas I have described and shown a practical and operative device, nevertheless many changes may be made in the size, shape, number and disposition of parts without departing from the spirit of my invention. I therefore wish my description and the drawing to be taken as in a broad sense illustrative or diagrammatic, rather than as limiting me to my precise showing.

The use and operation of my invention are as follows:

It will be observed that I have produced a reversible baking tray, one advantage of which is that different types of baking can be done on opposite sides of the same tray, without cleaning or preparation of the tray. For example, one side of the tray may be employed for baking articles with which a substantial amount of grease is employed, and the other side may be employed for baking in which the tray is coated with dusting flour, and grease is not employed. Ordinarily, as where the usual baking trays are employed in baking biscuits or the like, it is necessary to clean the tray before switching it from one kind of baking to another. This is not necessary with my tray and the same tray may be employed for different types of baking by merely reversing it. My tray is reversible and is equally usable with either side up.

In employing a sheet metal tray, it is advantageous to be able readily to repair the tray. With my type of tray and reinforcing surrounding slotted rod, it is possible to remove the outside rod by merely breaking the securing welds or other securing means employed and bending the rod off and then rolling out the kinks, dents or the like that are caused by rough handling. After the body 1 has been rolled back into flat position, the rod can be bent back into place and crimped or re-welded or otherwise secured in its original position.

The slotted rod also allows for the expansion of the sheet metal in the slot and will tend to reduce the buckling of the pan under the heat. This characteristic is an advantage of the device shown for example in Figures 1 to 6 and it will be observed that a slight clearance is provided so that the pan body 1 may expand laterally when subjected to heat without buckling or deforming. However, the form of Figures 6 and 7 has substantial advantages of reversibility.

A further feature of advantage in the form of Figures 1 to 6 is the protection of the edge of the body 1 from rust, erosion or the like. I make my pan with a sheet metal stock having a protecting coating. For example, it has a natural protective scale which is rolled into the sheet and serves to retard rust or the like. In cutting and forming the sheet along the edges, however, this protective scale or covering is broken and the exposed edge is likely to rust or corrode, an action which is particularly bad at the corners of the sheet. I therefore find it highly advantageous to employ the slotted reinforcing rod shown in Figures 1 to 6 since it houses the edge of the sheet and protects it from corrosion, and eliminates the necessity of a forming operation such as in Figure 7.

The faces of the sheet 1 which are exposed to the air and to the articles undergoing baking are provided with their protective coating and rust or corrosion does not normally take place. Since the flat body portion is not deformed or crimped or passed through deforming presses, no breaking down or destruction of the protective coating takes place except along the actual line along which the body is sheared and this exposed surface, resulting from the shearing or cutting, is entirely housed within the rod or the surrounding member 2.

I find it highly advantageous, for example for pans used in automatic dumping machines, to have the faces of the members 2 so formed or inclined as to permit the goods to slide off readily when the pan is used or tilted in a dumping machine. This also may be advantageous in pan handling but is particularly advantageous in connection with automatic handling. For this result, the triangular rod shown at 2 in Figure 6 and at 10 in Figure 7 is highly advantageous. However, the oval rod shown in Figure 4 is efficient and under some circumstances even the round rod of Figures 2 and 3 is satisfactory. It will be understood of course that whereas a triangular rod is highly advantageous, the shape of the rod may be widely varied while still maintaining much of the advantage of my invention.

The employment of a slotted rod eliminates the loosening of the metal of the body 1 in relation to its reinforcement which may under some circumstances be a disadvantage in pans of the type of Figures 7 and 8 in which the body is wrapped around the rod. The edges of the body are entirely protected in the form of Figures 1 to 6 and cannot be battered or deformed when the pans are banged against the edges of oven shelves and conveyors and the sheet or body is thus protected from buckling, buckling from such hard handling being one of the main causes of wear and replacement of baking pans of this type.

I claim:

1. As a new article of manufacture, a reversible baking tray including a generally flat, substantially rectangular body portion of sheet metal, and a surrounding reinforcement therefor, formed of solid metal rod stock, said reinforcement extending circumferentially entirely around the edge of the body portion and conforming thereto, and being slotted to receive the edge of said body portion throughout the entire periphery of said body portion, said slot being located substantially midway between the top and bottom of the reinforcement, whereby the contour of the reinforcement and the angular relationship of the abutting portions of the reinforcement and the adjacent face of the body portion are uniform on both top and bottom of the tray, the angular relationship of the edge of the reinforcement adjacent the body portion being adapted to permit a ready sliding of cooked articles over the reinforcement when the pan is tilted.

2. As a new article of manufacture, a reversible baking tray including a generally flat, substantially rectangular body portion of sheet metal, and a surrounding reinforcement therefor, formed of solid metal rod stock, said reinforcement extending circumferentially entirely around the edge of the body portion and conforming thereto, and being slotted to receive the edge of said body portion throughout the entire periphery of said body portion, said slot being located substantially midway between the top and bottom of the reinforcement, whereby the contour of the reinforcement and the angular relationship of the abutting portions of the reinforcement and the adjacent face of the body portion are uniform on both top and bottom of the tray, the angular relationship of the edge of the reinforcement adjacent the body portion being adapted to permit a ready sliding of cooked articles over the reinforcement when the pan is tilted, the ends of said reinforcement being welded to each other and to the body portion.

3. As a new article of manufacture, a reversible baking tray including a generally flat, substantially rectangular body portion of sheet metal, and a surrounding reinforcement therefor, formed of solid metal rod stock, said reinforcement extending circumferentially entirely around the edge of the body portion and conforming thereto, and being slotted to receive the edge of said body portion throughout the entire periphery of said body portion, said slot being located substantially midway between the top and bottom of the reinforcement, whereby the contour of the reinforcement and the angular relationship of the abutting portions of the reinforcement and the adjacent face of the body portion are uniform on both top and bottom of the tray, the angular relationship of the edge of the reinforcement adjacent the body portion being adapted to permit a ready sliding of cooked articles over the reinforcement when the pan is tilted, the rod stock of which said reinforcement is formed being triangular in cross section and being slotted along the apex of such triangle.

4. As a new article of manufacture, a reversible baking tray including a generally flat, substantially rectangular body portion of sheet metal, having rounded corners, and a surrounding reinforcement therefor, formed of solid rod stock and of a diameter small in relation to the dimensions of the articles to be cooked, said reinforcement extending circumferentially entirely around the edge of the body portion and conforming thereto and being rounded at the corners, and being slotted to receive and protect the edge of said body portion throughout the entire periphery of said body portion, said slot being located substantially midway between the top and bottom of the reinforcement, whereby the contour of the reinforcement and the angular relationship of the abutting portions of the reinforcement and the adjacent face of the body portion are uniform on both top and bottom of the tray, the angular relationship of the edge of the reinforcement adjacent the body portion, and the diameter of the reinforcement, being adapted to permit a ready sliding of cooked articles over the reinforcement when the pan is tilted.

WARREN H. HUNGERFORD.